Sept. 8, 1970  H. HAUSENBLAS ET AL  3,527,452
CONNECTING DEVICE FOR A HYDROPNEUMATIC SPRING MEMBER
HAVING AN ADDITIONAL GAS BUBBLE
Filed Sept. 29, 1967
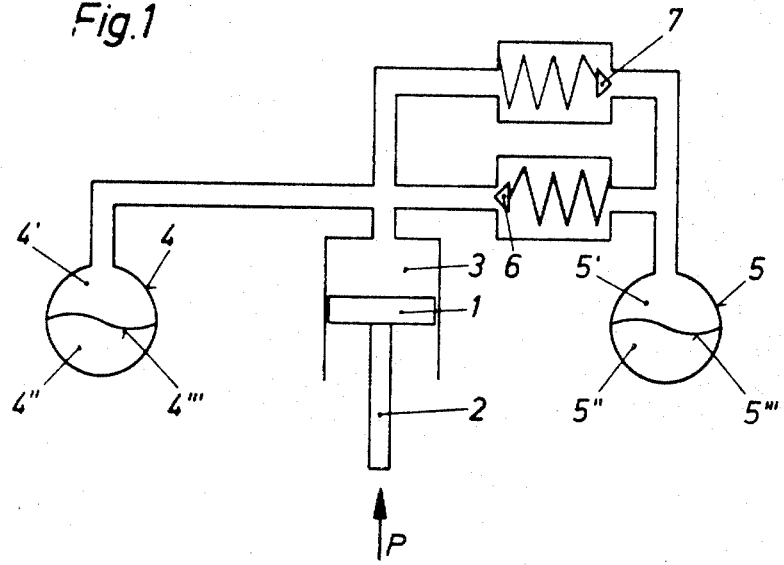
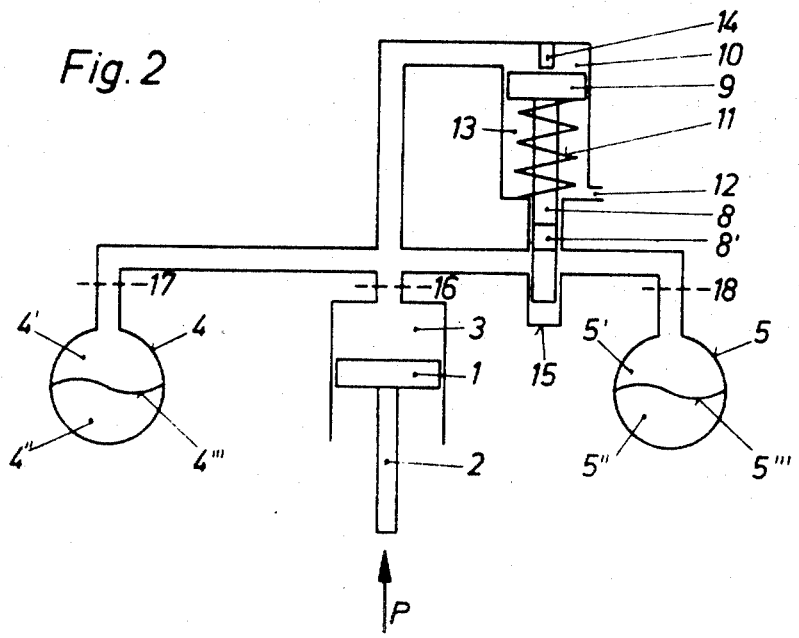

United States Patent Office 3,527,452
Patented Sept. 8, 1970

3,527,452
CONNECTING DEVICE FOR A HYDROPNEU-
MATIC SPRING MEMBER HAVING AN
ADDITIONAL GAS BUBBLE
Helmut Hausenblas, Kassel, and Karl Schindler, Frankfurt am Main, Germany, assignors to Rheinstahl Henschel A.G., Kassel, Germany, a corporation of Germany
Filed Sept. 29, 1967, Ser. No. 671,852
Claims priority, application Germany, Oct. 8, 1966, R 44,310
Int. Cl. F16f 5/00
U.S. Cl. 267—126                                                                    3 Claims

ABSTRACT OF THE DISCLOSURE

This invention relates to an improved connecting device for a hydropneumatic spring member comprising a piston and cylinder, a first gas bubble connected to the cylinder and being operative in the vicinity of the static value of the wheel force, and at least one additional gas bubble adapted to be connected to the cylinder in case of higher values of the wheel force, the improvement comprising means operative in dependence upon a specific pressure in the first gas bubble or the cylinder for connecting the additional gas bubble to the cylinder.

---

Hydropneumatic spring members for vehicles in their original form, i.e., without additional gas bubbles, have the disadvantage that due to their progressive spring characteristics they either have, in case of a great volume of the gas bubbles in the area of the static load, too low a rigidity or, in the case of a small volume of the gas bubbles, too small a usable spring deflection or stroke and the latter is a consequence of the high compression rate of the gas bubbles with relatively small variations in the spring deflection.

It is known in the art that these difficulties can be overcome by causing only one gas bubble to be operative in the vicinity of the static load and by additionally connecting one or more gas bubbles after a specific deflection has been exceeded. This connection is effected during the spring deflection by means of a spring-loaded, high-pressure relief valve, both sides of which are subjected to the pressure in the originally operative gas bubble and to the pressure of the additionally connected gas bubble. This valve will open only when the pressure in the gas bubble which is originally operative exceeds the prestress pressure of the gas bubble to be connected by the amount which is determined by the spring-loading of the high pressure relief valve. At the end of the spring deflection, this high pressure relief valve will close and a second valve connected in parallel with the first valve will open and permit the passage of the hydraulic fluid only in the direction of the descending stroke or deflection. The spring-loading of this second high pressure relief valve is generally selected to be considerably lower than that of the first mentioned valve.

This known hydropneumatic spring member has the following disadvantage: for reasons of stability, the gas bubbles can be considered to be safely operated only up to specific maximum pressures. Due to the fact that the difference of the pressures in the gas bubbles is maintained by means of the first mentioned high pressure relief valve during all of the stroke movements or spring deflections, the additional gas bubble can obtain only the pressure being lower by the afore-indicated pressure difference even after the permissible maximum pressure in the originally operative gas bubble has been attained. Accordingly, when the originally operative and the additional gas bubbles are similarly constructed, for purposes of standardizing the manufacture thereof, and when they thus also have the same permissible maximum pressure, the additional gas bubble never can be utilized up to the maximum limit thereof, which results in a decrease of the usable spring deflection of the hydropneumatic spring member as compared to the value being otherwise determined by the pressure limit of the gas bubbles. Furthermore, the throttling effected by the first-mentioned high pressure relief valve produces an essential damping of the stroke, which is frequently undesirable.

The present invention provides a device for connecting the additional gas bubble which eliminates the disadvantages and drawbacks discussed above. The device includes a spring-loaded high-pressure relief valve which effects the connection and in which the force for overcoming the spring force is supplied exclusively by the pressure in the originally operative gas bubble.

One embodiment of the present invention is illustrated in the accompanying drawings in which:

FIG. 1 shows a known type of construction, for purposes of clarification, and

FIG. 2 shows one construction of the connecting device of the present invention.

Referring to the drawings, in which similar elements have been identified with the same reference numerals in both figures, numeral 1 identifies a hydraulic piston secured to the piston rod 2 upon which latter the force P, originating from the spring-suspended or spring-mounted wheel, not shown, acts. Reference numeral 3 indicates the associated cylinder space for the piston 1, which cylinder space is filled with hydraulic fluid.

Reference numeral 4 identifies the gas bubble which is operative in the vicinity of the static value of P while reference numeral 5 designates the additional gas bubble, and reference numerals 4' and 5', respectively, represent the hydraulic fluid chambers thereof. The numerals 4" and 5" identify the gas chambers of the gas bubbles and numerals 4''' and 5''', respectively, identify the separating members of the gas bubbles between the hydraulic fluid and the gas. Reference numeral 6 identifies, in the known construction according to FIG. 1, the high-pressure relief valve which is preloaded by means of a relatively strong spring for the stroke movements, and reference numeral 7 designates the high-pressure relief valve being preloaded by means of a relatively weak spring for the end-of-stroke or descending stroke movements. Both sides of the valves are acted upon by the pressures in the initially or originally operative gas bubble 4, and also in the additional gas bubble 5, and operate accordingly.

On the other hand, the construction of the present invention, as illustrated in FIG. 2, contains a connecting device or means which is shown as being provided with a slide member 8. The piston 9 which is connected to and displaces the slide member 8 is biased, on the one hand, by pressure in the chamber 10 which latter is in operative engagement with the chamber 4' of the initially operative gas bubble 4 and also with the cylinder space 3, and, on the other hand, is biased by the spring 11 which is positioned in the chamber 13, which latter is vented to the atmosphere by means of the aperture 12 and is thus pressureless. As long as the force P has values in the neighborhood of the static value thereof, the spring 11 will force the piston 9 against the upper abutment 14, against the fluid pressure in the chamber 10, and the bore 8' in the slide 8 will assume a position such that access to the additional gas bubble 5 is blocked.

However, once the force P exceeds a value which may be predetermined by the force of the spring 11, the piston 9 will be moved downwardly against the force of the spring 11, due to the fluid pressure prevailing in the chamber 10, until the slide 8 finally abuts at 15, whereby the additional gas bubble 5 is connected to the hydraulic system and is thereby rendered operative. When the force P decreases, the connecting operation of the slide member 8 proceeds analogously in the opposite direction. Conventional throttle valves for producing the damping of the spring member may be positioned either at the points 16 and 18, or at the points 17 and 18. In accordance therewith, the chamber 10 is charged either with the pressure in the chamber 4' of the gas bubble 4, or with the pressure within the cylinder space 3.

It will be obvious to those skilled in the art that many modifications may be made within the scope of the present invention without departing from the spirit thereof, and the invention includes all such modifications.

What is claimed is:

1. In a connecting device for a hydropneumatic spring member comprising a piston and cylinder, a first gas bubble connected to the cylinder and being operative in the vicinity of the static value of wheel force, and at least one additional gas bubble adapted to be connected to the cylinder in case of higher values of wheel force, the improvement which comprises slide means operative in dependence upon a specific pressure in the first gas bubble or the cylinder for connecting the additional gas bubble to the cylinder.

2. A device according to claim 1 in which said means includes a piston and slide member which is biased in the open direction by fluid pressure and in the closed direction by spring means.

3. A device according to claim 2 in which the slide member has an aperture therein for passage of fluid to the additional gas bubble.

References Cited

UNITED STATES PATENTS 3,222,047  12/1965  Tuczek _____ 267—64

JAMES B. MARBERT, Primary Examiner

U.S. Cl. X.R.

267—64